Patented July 29, 1941

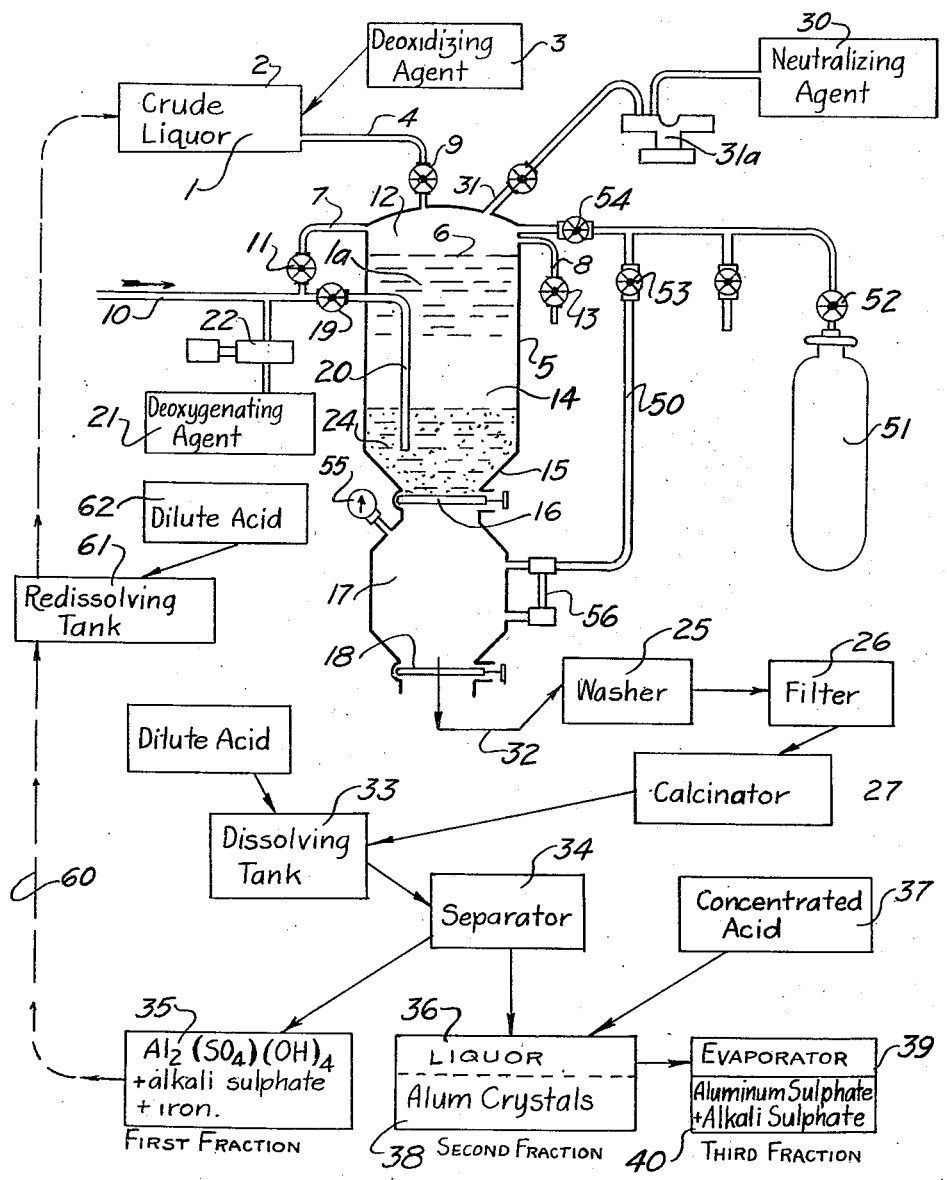

2,250,926

UNITED STATES PATENT OFFICE 2,250,926

PROCESS FOR RECOVERING ALUMINUM COMPOUNDS

Louis F. Clark, Montebello, Calif., assignor to Filtrol Corporation, Los Angeles, Calif., a corporation of Delaware Application October 20, 1937, Serial No. 170,029

6 Claims. (Cl. 23—123)

The invention relates in general to the production of aluminum compounds from aqueous solutions, and relates in particular to the manufacture of relatively pure and commercial forms of aluminum salts, etc. from crude, complex and impure aqueous solutions containing aluminum sulphate and sulphates of other metals such as iron, magnesium and alkali metals, and the solution may contain small amounts of other anions, such as chlorine.

It is an object of the invention to economically separate certain aluminum salts, double salts and compounds of alumina in relatively pure, or commercially acceptable form from relatively complex and impure compounds occurring in nature. The invention is especially adapted for use on complex and impure compounds containing aluminum, magnesium, iron, silicates, etc.

It is a further object of the invention to produce commercial compounds of aluminum as by-products from the waste liquor from the treatment of natural clays to activate the same for use in decolorizing and purifying oils and greases. Clays suitable for this purpose, for example, the bentonites, are washed with sulphuric acid to dissolve a part of the content of alumina, magnesium, etc. This waste liquor contains sizable quantities of valuable salts, principal among which is aluminum sulphate which is ordinarily thrown away. My present invention makes it possible to readily reclaim the more valuable and useful of these constituent parts of the waste liquor at relatively low cost and in such form that they may be used in the various arts without the need for further extensive refining. Among the valuable by-products which are obtained by the invention are basic alkali aluminum sulphate, basic aluminum sulphate, alum, aluminum sulphate and paper maker's alum.

It is a further object of the invention to provide a process for accomplishing results such as those specified herein, wherein precipitation of the primary basic salts is accomplished under control and in the presence of heat and pressure. A feature of the process of precipitation is that it may be conducted in several stages and several qualities or purity of products may be thereby obtained. A further valuable feature of the invention resides in the separation from the precipitates of a number of valuable extracts which are especially suitable for commercial use. I find that under proper conditions I am able to precipitate a basic aluminum sulphate, containing variable quantities of alkali which is substantially iron-free, that is to say such substance contains about .03% of iron. Also from any of these precipitates of basic aluminum sulphate, the invention makes possible the production of iron-free aluminum sulphate, aluminum sulphate containing iron and also iron-free double salt of aluminum and alkali.

Further objects and advantages of the invention will be brought out in the following part of the specification, describing a preferred practice of the invention by use of equipment diagrammatically shown in the accompanying drawing which is for illustrative purposes only.

Sources of crude liquor

A solution 1 containing aluminum salts is first treated in a storage tank 2 with a deoxidizing agent. This solution is obtained from natural materials, such as clay, by the leaching of the same with an acid solution, for example, dilute sulphuric acid. The solution contains in addition to the valuable salts of alumina, other materials of contaminating nature, such as iron, magnesium, etc.

It is to be understood that the practice of the invention may be carried on with a solution obtained directly from the leaching of earth materials, or the solution may result from the dissolution of crude or complex aluminum salts with water or dilute sulphuric acid. By crude aluminum salts, I mean those which contain impurities such as a ferric or ferrous salts, magnesium salts, etc., and other constituents which render crude aluminum salts unsuitable for many uses.

The concentration of the solution 1 used in the process may vary considerably, but for the purpose of illustration, I shall refer to one of the strengths of solution which I have used in practice and which I find gives satisfactory results, such solution having substantially the following therein:

|  | Grams per liter |
| --- | --- |
| Alumina, $Al_2O_3$ | 25.0 |
| Free acid, $H_2SO_4$ | 1.0 |
| Iron, Fe | 2.0 |
| Magnesia, MgO | 8.0 |
| Alkali $(Na_2O—K_2O)—R_2O$ | 2.0 |

The alkali $R_2O$ referred to may be sodium or potassium oxide, or a mixture of the two. The crude or complex solution may be the waste liquor resulting from the treatment of aluminum silicate clays, for example bentonite and montmorillonite, for the purpose of activating the same to make them useful in the decolorization and purification of oils, but it is to be understood that I do not limit the practice of my invention to the production of aluminum compounds from a liquor obtained from this source.

Deoxidizing of crude liquor

In the storage tank 2, the crude liquor is subjected to an admixture of a deoxidizing agent for the purpose of reducing iron, etc. to their lowest state of oxidation. For this purpose, I maintain a supply of sulphur dioxide in a container 3 and feed the same into the liquor 1 in the storage tank 2 in a proportion which may vary in accordance with the condition of the liquor. Ordinarily, I use about 1.0 g. of $SO_2$ per each gram of iron in liquor 1, the liquor and sulphur dioxide being preferably intermixed by agitation. There are a number of different ways in which the crude liquor may be dioxidized. Sulphur dioxide is of especial advantage where a catalyst is present in the solution, and to pass the liquor which has sulphur dioxide therein over scrap metals such as scrap aluminum, scrap zinc or scrap iron will have the advantage of removing arsenic or antimony from the liquor. Among the catalysts which I may use are the various metals and iodine. The quality desired in the reducing agent employed is that it shall function at the temperature used in the process. To indicate the general character of reducing agents which I may employ, it may be stated that hyposulphites or hydrogen sulphide are suitable for this purpose. A manner in which the crude liquor may be prepared, is to first add to a crude aluminum sulphate a desired quantity of reducing agent, for example sulphur dioxide, and then contact the aluminum sulphate with a metal. At low temperatures the effectiveness of this treatment is improved by the addition of iodine to the solution. As an alternative, I may allow the crude aluminum sulphate solution to trickle downwardly through a treating chamber having suitable metal disposed in the path of downward flow of the aluminum sulphate solution, and pass a counter-current flow of sulphur dioxide gas upwardly through the treating chamber.

Preparing of liquor for precipitation of salts therefrom

For the steps of precipitation employed in the practice of the invention, as will be hereinafter clearly explained, I use an autoclave 5 having a chamber 14 with a conical bottom 15 which connects through a valve 16 with a receiver 17, having a valve 18 at the lower end thereof. During the filling of the autoclave 5 with liquor, the valve 16 is closed so that the chamber 14 is shut off from the receiver 17.

From the tank 2, a quantity of the liquor 1 is conducted through a pipe 4 into the autoclave 5 which is preferably lined with acid-proof brick or tile. As indicated at 1a the body of liquor in the autoclave is brought up to a level 6, this level being below steam inlets and outlets 7 and 8. Valve 9 in the liquor inlet pipe 4 is then closed and an inert gas such as nitrogen, or treated steam from a supply pipe 10 is passed through a valve 11, the inlet 7, and through space 12 at the top of the autoclave 5 and out through the steam outlet 8, to sweep out all of the air and oxygen which may be in the space 12 after the placing of the liquor 1a in the autoclave 5. Valve 11, controlling the gas or steam inlet 7 and valve 13 of the steam outlet 8 are then closed, leaving the space 12 at the top of the autoclave filled with inert gas or treated steam and the liquor contents 1a of the autoclave 5 ready for the succeeding steps of the process.

The treated steam hereinbefore referred to is one prepared from water which has been boiled under vacuum and is further treated in the steam boiler by chemicals with the result that the steam is substantially completely deaerated and deoxygenated.

First precipitation

With the autoclave 5 closed, a valve 19 connected with the steam supply pipe 10, is opened and the treated steam is delivered into the liquor 1a through a steam injection pipe 20 which has its outlet end disposed within the autoclave 5 near the lower end of the chamber 14. This injected steam heats the liquor 1a and at the same time builds up the pressure in the autoclave, the result being that the liquor 1a is subjected to both heat and pressure while substantially isolated from oxygen or oxygen containing atmosphere. To assure that all substantially free oxygen will be neutralized in the autoclave 5 during the steps of precipitation, I may inject a deoxygenating agent continuously with the steam. For this purpose I have shown a container 21 for a supply of agent such as $SO_2$, and a pump 22 for feeding the agent into the piping 10 through which the flow of treated steam passes to the autoclave 5. A number of deoxidizing agents may be employed, and an agent should be selected which will operate at the temperatures existing in the autoclave. Although I prefer to use sulphur dioxide for this purpose, it is evident that hydrogen sulphide, formaldehyde and other chemicals of similar characteristics may be employed.

As the temperature and pressure in the liquor increase, a precipitation of salt from the liquor takes place, such salt being principally a hydrous basic sulphate of alumina typified by the following formula:

$R_2SO_4.Al_2SO_4(OH)_4$ with .03% or less of iron 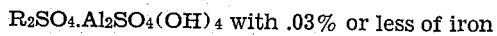

I intend to convey the information that the alkali may be sodium, potassium or ammonia, etc. or may include several of these elements and that the proportion of these alkalies may vary from zero value to the amount required by the above formula. This first precipitate which collects at 24 in the chamber, it will be noted, has a very small content of iron and is therefore acceptable to the trades as relatively iron-free hydrous alkali aluminum sulphate.

For the character and concentration of liquor disclosed in this specific example, a temperature of 170° C. with a corresponding pressure of 100 lbs. per square inch, may be employed in the autoclave 5. The foregoing temperature and pressure are cited merely as an example, it being known that the same is not critical and that acceptable results may be obtained where temperature and pressure are varied materially from the foregoing. The formation of the precipitate is not instantaneous but starts at around a pressure of 50 lbs. per square inch in the autoclave 5 and the rate of precipitation increases rapidly as the pressure approaches 100 lbs. per square inch. After a pressure of 100 lbs. per square inch is reached and through higher pressures the rate of increase of precipitation is relatively slow, so that it is not considered economical to carry the pressure above the value of 100 lbs. per square inch for a strength of solution such as hereinbefore given.

After precipitation of the first precipitate in the chamber 14, the pressure in the receiver 17 may be built up to substantially the pressure existing in the autoclave 5, so that when the valve 16 is opened the first precipitate may be permitted to flow at relatively low velocity and without material agitation from the lower part of the chamber 14 into the receiver 17. In this manner the first precipitate is transferred from the autoclave 5 to the receiver 17 under control and without danger of cutting the exposed parts of the valve 16. As a means for controlling the pressure in the receiver 17 I show piping 50 for delivering an inert gas, such as nitrogen, from a container 51 into the receiver 17. Although the preferred form of my invention employs nitrogen, reasonably satisfactory results may be obtained by use of any oxygen-free gas, for example, carbon dioxide, etc. Likewise, the deoxygenated and deaerated steam from the pipe 10 could be directed into the receiver 17 to bring the pressure therein to a value close to the pressure in the autoclave 5. Through the use of valves 52 and 53 in the piping 50, gas is permitted to flow from the container 51 into the receiver 17 until the desired pressure is noted on a pressure gauge 55 which is connected thereto. After this, valve 52 may be closed and valve 54, which connects the piping 50 with the upper part of the autoclave 5 may be opened so that there will be a pressure equalizing connection between the receiver 17 and the upper part of the chamber 14. Then, when the valve 16 is opened there will be a flow by gravity, or under small pressure, of the first precipitate and entrained solution into the receiver 17, and the quantity thereof which has been transferred into the receiver 17 may be noted by means of a gauge glass 56 mounted on the exterior of the receiver 17.

*Second precipitation*

After transfer of the first precipitate to the receiver 17, gate 16 may be closed so as to isolate the receiver 17 from the chamber 14. Then, against the pressure existing in the chamber 14 of the autoclave, a neutralizing agent may be injected into the hot liquor 1a, the purpose of the same being to neutralize a large portion of the acid which is regenerated in the solution as the result of precipitation of the first precipitate and also to supply in any of the ways hereinafter pointed out such additional alkali salt as may be required, so that a further precipitation of salt is accomplished. This regeneration of acid in the solution is represented in the following equation:

(a) $Al_2(SO_4)_3 + 2H_2O \rightleftarrows Al_2(OH)_2(SO_4)_2 + H_2SO_4$ (b) $Al_2(SO_4)_3 + 4H_2O \rightleftarrows Al_2(OH)_4(SO_4) + 2H_2SO_4$

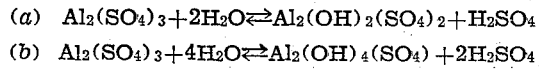

At room temperature and pressure the solution of $Al_2(SO_4)_3$ is stable but as the temperature and pressure are raised, hydrolysis begins as in (a) and continues up to an equilibrium value for each temperature and pressure; the higher these values the greater the extent of disassociation as in (b), and the more free acid which is regenerated—and the greater the proportion of alumina which is precipitated as basic salt. If, now, we wish to get a high proportion of precipitation of alumina without going to the very high temperature (and pressure) required, we can progressively neutralize a part of this "regenerated" acid—thus securing a greater yield of precipitate at lower temperature. This neutralizing agent apparently enters immediately into solution with the liquor after which an immediate or instantaneous precipitation of salt occurs, which salt collects in the lower part of the chamber 14 above the gate valve 16.

The second precipitate differs from the first precipitate 23 only by having therein a larger quantity of iron, for example the content of iron in the second precipitate may be 0.15% as compared to the 0.03% or less of iron in the first precipitate.

In that practice of the invention where the first and second autoclave precipitates are both allowed to collect in the autoclave instead of being taken from the autoclave separately, the following method of obtaining the precipitates may be followed. The neutralizing agent, such for example as the aluminous slurry from receptacle 30 may be mixed with the crude liquid in the tank 2 and delivered with crude liquor into the autoclave after which the liquor is heated by use of deoxygenated steam as previously described. When the first precipitate forms an amount of free acid is released or regenerated in the solution in the autoclave. This regenerated acid will then react with the neutralizing agent so that a neutral condition will be again produced in the solution and a second precipitation of a complex, relatively pure aluminum sulphate will occur in the autoclave 5. I find, however, that best results may be obtained where the first precipitate is first allowed to form and the slurry is then pumped slowly into the solution to cause precipitation of the second precipitate.

A number of different neutralizing agents may be used, for example a carbonate such as sodium, calcium or magnesium carbonate, ammonia, or any of the oxides, hydroxides, sulfites, etc. However, it is a feature of my invention to employ a neutralizing agent which will increase the production of basic aluminum sulphate in the second step of precipitation owing to the presence of aluminum in this reagent which aluminum is added to the second precipitate.

For use as this preferred neutralizing agent I form a slurry such as the precipitate resulting when soda ash is mixed with a crude aqueous solution containing aluminum sulphate. This slurry which includes alkali sulphate, is of such slimy character that it may be readily pumped by any suitable pumping means, such as a reciprocating pump 31a, from a receptacle 30 through an injection tube 31 into the upper part of the autoclave against the pressure therein. This slurry may be mixed with the original solution before it is placed in the autoclave, but in preferred practice the original solution, after precipitation of the first precipitate, is maintained at desired temperature and pressure, and the slurry is then slowly pumped in against the pressure in the autoclave. $SO_2$ is added to the slurry in a quantity which varies with the quantity of iron in the slurry to be reduce. As an example, I may cite that 2 to 4 pounds of $SO_2$ or its equivalent in the form of a sulphite salt, may be added to the slurry for each pound of contained iron. It will be recognized that other reducing agents may be employed, among which are the commercial salts of hyposulphurous acid, generally employed in vat dyeing, or the equivalent made in situ by adding both $SO_2$ and zinc dust to the slurry. I also find that this slurry owing to its free flowing character will satisfactorily serve as a vehicle for carrying a powdered neutralizing agent, such for example as bauxite, calcium or magnesium carbonate or magnesium oxide, into the autoclave 5 against the pressure existing therein, should it be desired to use such a solid insoluble neutralizing agent.

A feature of the invention is that I may also mix the finely-powdered solid neutralizing agent, or agents, for example bauxite, calcium carbonate, magnesium carbonate, magnesium oxide or zinc oxide so as to form a paste thereof which is pumped into the autoclave, and a further feature is that in the neutralizing agent I employ an excess of deoxidizing agent, that is to say I employ therein a larger quantity of deoxidizing agent than is actually required to reduce the iron content of the slurry or mixture to be pumped into the autoclave for the purpose of producing therein the second precipitation hereinbefore described.

It will be of particular interest to note that these autoclave precipitates may be calcined at about 625° C. so as to make them soluble in dilute acid whereas as formed they are insoluble. Thus they may be used to form a number of valuable aluminum compounds now being used in the various arts. The precipitates when calcined are found to have a content of alumina of 43% and if desired the first precipitate may be taken separately from the second precipitate, and used without further refining owing to its substantially negligible content of iron. However, in the preferred practice of the invention I subject both the first and second precipitates to fractionation, and ordinarily I do not separate the first and second precipitates but allow them to collect in the lower part of the autoclave 5, after which they are together subjected to fractionation, an example of which is as follows:

As indicated by the flow line 32, all of the autoclave precipitate is taken from the autoclave 5 through valves 16 and 18 to a washer 25 after which the precipitate is then passed through a calcinator wherein it is subjected to calcination, after which it is delivered into a dissolving tank 33.

It is an important feature of the invention to calcine the precipitate in such a manner and to such a degree that it will readily enter into or facilitate the accomplishment of certain valuable results which will be hereinafter set forth. For the purpose of this calcination, the precipitate is subjected to a temperature ranging between 600 and 650° C. I preferably maintain the temperature of calcination at about 625° C., for at this temperature the precipitate is calcined to a condition wherein it will dissolve in dilute acid in such a way that an efficient fractionation thereof can be accomplished.

The calcined material thus obtained will be found to be of substantially the following composition:

$R_2SO_4.2Al_2O_3.Al_2(SO_4)_3$—plus .15% (or less) iron

As hereinbefore set forth, this compound of alumina not only has a very high aluminum content but is also soluble in dilute acid; whereas most aluminum salts which are soluble in water are found to have an alumina content of from 11% to 18% instead of the 43% of alumina contained in this calcined precipitate.

Fractionation of the alkali aluminum sulphate

After being calcined, the precipitate is placed in the tank 33 wherein it is mixed with a sulphuric acid solution at such temperature and having therein such content of acid as to be incapable of completely dissolving or, in other words, of effecting an ultimate complete dissolution of the precipitate. This will result in an action which appears to consist of, first, a dissolving of the calcined precipitate and then, the progressive reformation of a basic sulphate precipitate in the solution. This precipitate has an iron content higher in proportion than the iron content of the original calcined precipitate. I find that, during the early part of the reformation of the precipitate of basic aluminum sulphate, the iron precipitates, or otherwise stated, the free alumina replaces the iron in solution so that the iron is precipitated while more alumina goes into solution as the sulphate. Accordingly, I am able, by controlling the time and the temperature at which the solution is held in the tank 33, to precipitate substantially all of the iron with a portion of the basic aluminum salt and thereby obtain a salt solution which is substantially free of iron. How this is done will be seen from the following examples:

First example

In the tank 33, to each gram of calcined autoclave precipitate having an iron content of 0.03%, is added 4½ cc. of 10% sulphuric acid. Some hydrogen peroxide is also added to insure all of the iron being in oxidized state. The solution thus formed is maintained at a temperature of 160° F. for a period of 120 minutes under which condition and during which time there is at first a nearly complete dissolution of the calcined precipitate followed by a reformation of basic sulphate precipitate in the solution, such precipitate having therewith substantially all of the iron contained in the original calcined autoclave precipitate. The solution, with its reformed precipitate is then conducted to a separator 34 which is preferably in the form of a filter, the reformed precipitate then being delivered from the separator 34 to a receptacle 35 and the filtrate conducted to a crystallizing tank 36.

The reformed precipitate deposited in the receptacle 35 is in re-hydrolyzed form similar to the precipitate taken from the autoclave 5, except that it can be dissolved in excess hot dilute acid. The weight of the quantity of reformed precipitate is about 20% of the weight of quantity of calcined precipitate originally placed in tank 33, with about .20% of iron and small quantity of alkali.

The filtrate from the separator which, as hereinbefore stated, is found to have substantially no iron content, is delivered to crystallizing tank 36 wherein it is mixed with a small quantity of acid from a container 37 and the temperature allowed to reduce to about 40° F., this resulting in a precipitation of a quantity of alum 38 in the tank 36. After this precipitation of alum, the liquor in the tank is conducted to a subsequent operation 39 consisting of dehydration to remove the free water contained therein, this leaving a third fraction 40 comprising aluminum sulphate.

Second example

In this example autoclave precipitate having a larger iron content, namely 0.2%, is placed in the tank 33 and mixed with 4½ grams of 10% dilute sulphuric acid for each gram of the autoclave precipitate, and a small amount of hydrogen peroxide is added thereto. With this larger content of iron, substantially 210 minutes is required to produce a separation of the iron, and during this longer period of time it is found that the quantity of basic aluminum sulphate precipitate reformed in the liquor amounts to about 40% of the quantity of autoclave precipitate placed in the tank. When practically all of the iron in the liquor has been caused to separate and has been combined with the reformed precipitate, the contents of the tank 33, as explained relative to Example 1, is carried to the separator 34 and then through the remaining steps of the process. The reformed precipitate delivered to the receptacle 35 is found to have an iron content of about 0.6%, but the second and third fractions are found to be of the same character as those previously set forth, that is to say, they will each have not more than 0.01% of iron therein and will respectively comprise true alum and an alkali aluminum sulphate.

*Disposal of first fraction*

The first fraction 35 which, as heretofore explained, contains substantially all of the iron in the calcined autoclave precipitate delivered to the tank 33 and thereafter treated may be converted to what is known as "paper maker's alum," as will be hereinafter described, but in the general practice of my invention, I prefer to run this first fraction back into the process at a point ahead of precipitation in the autoclave, for the purpose of disposing of the excess iron contained therein and of reclaiming the alkali and aluminum salts therefrom. Accordingly, as indicated by flow line 60, the undissolved residue or re-formed precipitate 35 may be conducted to a redissolving tank 61 wherein dilute acid from a tank 62 is employed to form a solution which is conducted to tank 2 to be combined with the complex aluminum sulphate solution which is to be subsequently deoxidized and conducted to the autoclave 5. The greater portion of the iron content of the first fraction will be carried off in the waste liquor from the autoclave 5 and the valuable salt content derived from the first fraction which has been thus returned to the system will pass again through the steps of the process which have been hereinbefore described. If a sufficient quantity of free acid is present in the crude liquor the reformed precipitate may be introduced directly into the crude liquor tank 2, wherein the free acid will assist in its dissolution. It will be understood that the reformed precipitate as an alternative practice, may be calcined before its introduction into the crude liquor tank whereby it becomes more actively soluble and more active in fixing free acid at this point in the process.

*Preparation of paper maker's alum*

Paper maker's alum as now employed in the paper-making industry comprises an aluminum sulphate having about 17% of alumina and .25% of iron therein. It has been noted that the first fraction or reformed precipitate 35 contains a much larger quantity of alumina and somewhat more iron therein than does commercial paper maker's alum. Accordingly, sulphuric acid and water may be combined with this precipitate to cut the same to an iron content of 0.25% or less. For example, it has been found that the precipitate 35 in some instances has an alumina content of about 35% and an iron content of 0.5%. If 0.4 part of water and 0.6 part of sulphuric acid by weight are added to 1 part of this precipitate, an aluminum sulphate having about 17% of alumina and 0.25% of iron will be produced; this being acceptable to the trade as paper maker's alum, although it may have some alkali therewith.

If the hereinbefore-described step of "fractionation" be omitted, the entire mass of autoclave precipitate, after being calcined, can be directly converted into a "paper maker's alum" by a process analogous to that described in the preceding paragraph.

*Production of a commercial form of aluminum acetate*

The precipitate from the autoclave 5 may be employed to produce a commercial aluminum acetate suitable for use in the textile industry. If the precipitate is calcined, the following alumina, alkali salt will be obtained:

$$R_2SO_4.2Al_2O_3.Al_2(SO_4)_3$$

Of this substance about two-thirds is analogous to sulphate. The calcined precipitate is capable of being entirely dissolved in a solution of dilute acetic acid; whereas the known aluminum oxides do not readily dissolve in dilute acetic acid. The solution thus obtained is of the following composition:

$$Al_2(C_2H_3O_2)_4SO_4$$

which composition, in a 20% solution, contains about 5% of alumina. Although this basic solution contains some sulphate, it will serve for most purposes in the textile industry. If desired, the sulphate may be precipitated from the alumina acetate solution by use of calcium acetate as a precipitant.

I claim as my invention:

1. A method of precipitating a relatively pure basic sulphate of aluminum from a solution which comprises confining a solution of aluminum sulphate in a closed space, injecting steam and a reducing agent into said solution to subject the solution to heat and pressure whereby a basic salt will be caused to precipitate therefrom, isolating the precipitated salt from the main body of the solution, and injecting a neutralizing agent into said main body of solution while maintaining the same in heated condition to cause a further precipitation of salt therefrom.

2. A method of separating a selected basic aluminum sulphate from a complex sulphate solution containing iron, comprising, subjecting the solution to heat and pressure under reducing conditions to precipitate a complex basic aluminum sulphate from the solution, separating the said last-named sulphate from the solution, calcining the same, then forming a final solution by mixing the calcined salt with an acid solution of insufficient acid strength to completely dissolve said calcined salt whereby a residue salt will be produced and separating the said residue salt from the final solution.

3. A method of separating a selected basic aluminum sulphate from a complex aluminum sulphate solution containing iron, comprising subjecting the solution to heat and pressure under reducing conditions to precipitate a complex salt from the solution, separating the salt from the solution, calcining the same, mixing the calcined salt with an acid solution of insufficient acid strength to sustain dissolution of all said calcined salt, whereby a residue salt will be formed, separating the last-named solution with its dissolved salt content from said residue salt, crystallizing a salt from said last-named solution, and then evaporating the water from the remainder of said last-named solution to collect a final quantity of salt.

4. A method of separating a selected basic aluminum sulphate from a complex aluminum sulphate solution containing iron, comprising subjecting the solution to heat and pressure under reducing conditions to precipitate a complex salt from the solution, separating the salt from the solution and calcining the same and mixing the calcined salt with an acid solution of insufficient acid strength to dissolve all of said calcined salt, separating the last-named solution with its salt content from the undissolved residue, adding acid to and dehydrating said last-named solution to leave a residue of salts.

5. A method of producing a relatively iron-free basic aluminum sulphate compound from a crude aluminum sulphate compound having iron therein and wherein reducing conditions are substantially maintained, comprising: subjecting a neutralized solution of said crude compound to heat and pressure to produce a precipitate of basic aluminum sulphate compound having some iron therein; calcining said precipitate; dissolving the calcined precipitate in a solution containing insufficient acid to completely dissolve said calcined precipitate whereby a mixture will be produced comprising an aluminum sulphate residue therein containing substantially all of the iron contained in said calcined precipitate and a solution having aluminum sulphate but being substantially free of iron; separating said aluminum sulphate residue from said last-named solution; and returning said aluminum sulphate residue to the first step of the foregoing process.

6. A method of producing a relatively iron-free basic aluminum sulphate compound from a crude aluminum sulphate compound having iron and other metals therein and wherein reducing conditions are substantially maintained, comprising: placing a neutralized solution of said crude compound under pressure and subjecting the same to heat in a non-oxidizing atmosphere and in the presence of a neutralizing agent, to produce a precipitate of aluminum sulphate compound having some iron therein; calcining said precipitate; dissolving the calcined precipitate in a solution containing insufficient acid to completely dissolve said calcined precipitate whereby a mixture will be produced comprising an aluminum sulphate residue therein containing substantially all of the iron contained in said calcined precipitate, and a solution having aluminum sulphate but being substantially free of iron; separating said reformed precipitate from said last-named solution; adding acid to said last-named solution to cause formation of sulphate crystals.

LOUIS F. CLARK.